3,410,870
DIFLUORAMINO COMPOUNDS AND METHOD OF PREPARING SAME

Robert K. Armstrong, Glassboro, and James A. Patterson, Carney's Point, N.J., assignors to E. I. du Pont de Nemours and Company, Wilmington, Del., a corporation of Delaware
No Drawing. Filed Jan. 8, 1962, Ser. No. 165,723
7 Claims. (Cl. 260—338)

The present invention relates to new difluoramino compounds and to processes for their manufacture.

Compounds containing nitrogen-fluorine bonds are useful in the manufacture of high-energy propellants. They are of particular interest because of the desirability of having compounds which give low molecular weight products on combustion. The specific impulse of a propellant is inversely proportional to the molecular weight of its combustion products and directly proportional to its combustion energy. Fluorine compounds have a high combustion energy and form low molecular weight products on decomposition. In order to improve compatibility of N–F compounds with other propellant ingredients without sacrificing energy content the presence of nitrate ester groups is helpful.

The products of the present invention are 2,3-bis(difluoramino)-1,4-butanediol dinitrate, and the intermediate to its manufacture, 5,6-bis(difluoramino)-1,3-dioxepane. The latter compound is prepared by reacting 4,7-dihydro-1,3-dioxepin with $N_2F_4$. 2,3-bis(difluoramino)-1,4-butanenediol dinitrate is prepared by reacting the 5,6-bis(difluoramino)-1,3-dioxepane with a nitrating acid.

The reaction of tetrafluorohydrazine with 4,7-dihydro-1,3-dioxepin to give 5,6-bis(difluoramino)-1,3-dioxepane can be effected either in the liquid or vapor phase. When the reaction is carried out in the liquid phase an inert diluent preferably is used in conjunction with the olefin to increase fluidity and to help dissipate the reaction heat. The diluent can be any liquid which is not reactive with the reaction components but is preferably low boiling enough to be removed easily from the reaction product by distillation. Compounds which are particularly suitable for diluents are halogenated hydrocarbons such as chloroform, methylene chloride and chlorofluoro compounds sold under the trade names of "Freon" and "Genetron" such as 1,1,2-trichloro-1,3,3-trifluoroethane.

The temperature at which the reaction between $N_2F_4$ and 4,7-dihydro-1,3-dioxepin is effected will vary according to the other reaction variables but in general will be within the range from about 75° C. to about 250° C. Generally, when it is desired to operate at the lower end of the temperature range, e.g., at 75–125° C., the reaction will be carried out in the liquid phase since such a procedure more conveniently provides a longer contact time using simpler equipment than a vapor phase procedure. In the upper ranges, e.g., at 125–250° C., a vapor phase procedure is more suitable, these temperatures being sufficient to provide the desired reaction in a shorter contact time. For vapor phase reactions at high temperatures quick removal of the product from the reaction zone is essential to prevent decomposition of the product.

The addition of $N_2F_4$ to 4,7-dihydro-1,3-dioxepin can be effected at atmospheric as well as superatmospheric pressure. For operation in the liquid phase, the use of superatmospheric pressure is desirable in order to achieve a reasonably high reaction rate and to prevent low-boiling solvent from vaporizing. Pressures as high as 500 p.s.i.g. and above can be used in liquid phase reactions but there is little or no advantage to be gained in operating at pressures above 500 p.s.i.g. For operation in the vapor phase the use of atmospheric pressure is entirely adequate. In this mode of operation elevated pressures are unnecessary and generally are not preferred.

The reactant ratios used are not critical to the present process although the $N_2F_4$ is preferably used in excess of the stoichiometric amount required to add two $NF_2$ groups to the double bond.

The difluoramino products are recovered from liquid reaction mixtures by distillation, preferably under vacuum. During the distillation the reaction diluent is also separated from the difluoramine.

When the bis(difluoramino)dioxepane is treated with nitrating acid the ring is cleaved with the formation of 2,3-bis(difluoramino)-1,4-butanediol dinitrate.

The nitrating acid used in the process of this invention is preferably a mixed acid, i.e., nitric acid admixed with an agent which assists in the formation of the nitronium ion, $NO_2^+$. The mixed acid can consist of nitric acid mixed with sulfuric acid, acetic acid, acetic anhydride, trifluoroacetic anhydride, and others. For economic reasons, however, the use of nitric acid-sulfuric acid mixture is preferred. Mixtures having compositions ranging from 20% $HNO_3$/60% $H_2SO_4$/20% $H_2O$ to 55% $HNO_3$/48% $H_2SO_4$ are generally suitable. The latter mixture is said to have −3% water which means that some free $SO_3$ is also present in the sulfuric acid.

The quantity of nitric acid used in the present process is at least 4 moles per mole of bis(difluoramino)dioxepane, i.e., the stoichiometric quantity. However, an excess, and preferably a large excess, of nitric acid generally will be used in order to assure complete reaction. The molar ratio of nitric acid to dioxepane can range from 4/1 to about 50/1 or more.

While it is not essential to nitrate the dioxepane in the presence of a diluent, preferably an inert diluent will be used to better effect dissipation of the heat of reaction and reduction of the oxidizing action of the nitric acid. Preferably, the inert diluent is a low-boiling compound such as a halogenated hydrocarbon, e.g., chloroform or methylene chloride. The reaction can be carried out with high efficiency without a diluent, however, provided that adequate agitation and cooling means are available.

The nitration of the dioxepane preferably is carried out within the range of about 0° C. to about 75° C., temperatures of about room temperature or lower being particularly preferred. While temperatures below 0° C. can be used, they are not generally practical because of the low reaction rate and the cooling required. Temperatures above 75° C. can be used, but such operation is generally undesirable because of the instability of the nitrate esters at these high temperatures and the resulting loss of yield. The process can be effected at atmospheric as well as superatmospheric pressure. Generally, no advantage results in the use of superatmospheric pressure unless a low-boiling diluent is used.

The product is recovered by conventional means such as extraction from the nitrating acid by a solvent for the diol dinitrate followed by distillation and separation of the diol nitrate from the diluent and extractant. Suitable extractants are halogenated hydrocarbons such as methylene chloride, chloroform and carbon tetrachloride although any solvent for the diol dinitrate, not reactive to it, which is not miscible with or attacked by the nitrating acid is likewise suitable.

The following examples illustrate the invention although many other modifications will be apparent to those skilled in the art. Parts where given are by weight.

Example 1

2-butene-1,4-diol (352 parts), formalin (390 parts), and phosphoric acid (50 parts), are mixed in a vessel equipped with a condenser and thermometer. The mixture is heated to 93–95° C. and a water-containing azeotrope is distilled off. After about one half the material has distilled, two layers separate. After the distillation is complete the aqueous phase is saturated with NaCl and the mixture of the two phases extracted twice with 100 ml. of $CH_2Cl_2$. After drying over $MgSO_4$ the extract is distilled to give 267 parts of product boiling at 125–127° C. This product is shown to be 4,7-dihydro-1,3-dioxepin by infrared and nuclear magnetic spectroscopy and elemental analysis.

4,7-dihydro-1,3-dioxepin (14 parts) is dissolved in 110 parts of $CHCl_3$ in a pressure vessel. The vessel is pressurized with $N_2F_4$ to 300 pounds per square inch and the contents heated to 80° C. and the pressure to 420 p.s.i. After mixing for 45 minutes the vessel is cooled to room temperature, the product is removed and distilled at reduced pressure. Fifteen parts of product were collected distilling at 37–47° C. at 0.9 mm. pressure. This product is shown to be 5,6-bis(difluoramino)-1,3-dioxepane by infrared, nuclear magnetic resonance and elemental analysis.

The infrared spectrum has a peak in the N–F region at $11.8\mu$ and peaks characteristic of the C—O—C group at $8.7\mu$ and $8.95\mu$.

The proton nuclear magnetic resonance spectrum has a main peak removed 282 cycles from a tetramethylsilane standard and other characteristic peaks at 258, 248, 262, 288, 286, 254, and 244 cycles from the standard. The main peaks in the fluorine nuclear magnetic resonance spectrum are 2355, 2337, 2907, 2882, 2748, 2723 cycles from a $CFCl_3$ standard. The molecular weight is determined as 204 by mass spectroscopy as compared to the theoretical value of 204.

Explosive testing of this product yields the following results:

The material detonates 50% of the time when struck by a 5 kilogram weight falling 96 inches. An 8.3 gram ball fails to detonate a sample of the material falling from a height of 45 inches. A static discharge of 77,500 man equivalent volts (1 man equivalent volt=energy of a condenser of 0.003 microfarad capacitance charged to a potential of 1 volt) fails to ignite the product. An E-94 cap containing 2 grams of PETN as the base charge and 2 grains of lead azide as the primer failed to detonate the compound. When heated from 50° C. to 148° C. in 15 minutes the compound fumes off. When dropped on a bar heated at 250° C. the compound boils off quietly.

Example 2

5,6-bis(difluoramino)-1,3-dioxepane (6.1 parts) in 45 parts methylene chloride is added dropwise during a 15 minute period at a temperature of 5–8° C. (maintained by cooling in ice) to a stirred mixture of 72 parts of nitrating acid containing 50% nitric acid and 50% sulfuric acid with 45 parts of methylene chloride. After stirring for 15 minutes the mixture is warmed to room temperature and stirred for an additional 2 hours. The organic layer is removed. The acid layer is extracted two times with 100 ml. portions of methylene chloride. The extract is combined with the organic layer and washed with three 200 ml. portions of water and three 100 ml. portions of water. The extract is then dried over magnesium sufate and distilled to give a colorless liquid boiling at 86–91° C. at 0.35 mm. pressure. This product is shown to be 2,3-bis(difluoramino)-1,4-butanediol dinitrate by infrared and nuclear magnetic resonance spectroscopy and by elemental analysis.

The infrared spectrum has characteristic nitrate ester bands at 6.0, 7.77 and $11.8\mu$ and an NF band at $11.5\mu$.

The proton nuclear magnetic resonance spectrum has two main peaks separated from a tetramethylsilane standard by 302 and 297 cycles and two minor peaks at 264 and 242 cycles.

The fluorine spectrum has three main peaks removed 2377, 2400 and 2424 cycles from a $CFCl_3$ standard and two minor peaks removed 2285 and 2309 cycles.

This liquid is tested for explosive properties with the following results:

The material detonates 50% of the time when struck by a 1 kilogram weight falling 3 cm. With an 8.3 g. ball the compound does not detonate when struck after an 8 inch fall but does with a 10 inch fall. The compound detonates when exposed to a static discharge of 27,400 man equivalent volts 1-man equivalent volt=energy of a condenser of 0.003 microfarad capacitance charged to a potential of 1 volt). When dropped on a bar heated to 250° C. the compound fumes and detonates within 1 second. When heated from 50° C. to 250° C. within 15 minutes on a copper block no detonation of fume-off is noticed. When detonated by an E-94 cap containing 2 grains of PETN as the base charge with 2 grains of lead azide as a primer, in the standard test a No. 2 lead plate hole is obtained. This hole indicates that the material is a good explosive. This test is well known among those skilled in the art. The compound is thus shown to be a powerful explosive and useful as such.

We claim:
1. A process for the manufacture of 2,3-bis(difluoramino)-1,4-butanediol dinitrate which comprises
    (a) reacting 4,7-dihydro-1,3-dioxepin with $N_2F_4$,
    (b) distilling the 5,6-bis(difluoramino)-1,3-dioxepane from the mixture,
    (c) nitrating the 5,6-bis(difluoramino)-1,3-dioxepane with an acid mixture containing nitric acid,
    (d) extracting 2,3-bis(difluoramino)-1,4-butanediol dinitrate from the mixture with a solvent therefor,
    (e) distilling to recover 2,3-bis(difluoramino)-1,4-butanediol dinitrate.

2. A process for the manufacture of 5,6-bis(difluoramino)-1,3-dioxepane which comprises reacting 4,7-dihydro-1,3-dioxepin with $N_2F_4$.

3. The process of claim 2 wherein the $N_2F_4$ is dissolved in a solvent therefor.

4. A process for the manufacture of 2,3-bis(difluoramino)-1,4-butanediol dinitrate which comprises nitrating 5,6-bis(difluoramino)-1,3-dioxepane with an acid mixture containing nitric acid.

5. The process of claim 4 wherein the temperature used for the nitration ranges from about 0° C. to about 75° C.

6. 2,3-bis(difluoramino)-1,4-butanediol dinitrate.

7. 5,6-bis(difluoramino)-1,3-dioxepane.

References Cited

UNITED STATES PATENTS 3,331,867    7/1967    Smiley _____ 260—467

N. S. MILESTONE, *Primary Examiner.*